United States Patent [19]

Katsura et al.

[11] 4,317,682
[45] Mar. 2, 1982

[54] PIGMENT COMPOSITIONS AND USE THEREOF

[75] Inventors: Hiromitsu Katsura, Tokorozawa; Shigeyuki Ehashi, Kawagoe; Junichi Tsuchida; Kenichi Kakimoto, both of Tokyo, all of Japan

[73] Assignee: Toyo Ink Manufacturing Co. Ltd., Tokyo, Japan

[21] Appl. No.: 178,293

[22] Filed: Aug. 15, 1980

[30] Foreign Application Priority Data

Aug. 27, 1979 [JP] Japan .................. 54-108120

[51] Int. Cl.³ .................... C04B 31/28; C04B 31/38
[52] U.S. Cl. ............... 106/288 B; 106/288 Q; 106/292; 106/300; 106/301; 106/302; 106/304; 106/305; 106/308 N
[58] Field of Search ........... 106/288 B, 288 Q, 308 N, 106/308 S, 23

[56] References Cited

U.S. PATENT DOCUMENTS

| | | | |
|---|---|---|---|
| 2,370,868 | 2/1944 | Linton | 106/298 |
| 2,761,868 | 9/1956 | Lacey | 260/314.5 |
| 2,965,511 | 12/1960 | Moser | 106/288 |
| 3,404,119 | 10/1968 | Harper et al. | 106/308 S |
| 3,418,322 | 12/1968 | Tulagin et al. | 260/279 |
| 4,055,556 | 10/1977 | Aeberli | 106/23 X |
| 4,088,507 | 5/1978 | Tanaka et al. | 106/288 Q |

FOREIGN PATENT DOCUMENTS

| | | |
|---|---|---|
| 41-2466 | 2/1948 | Japan . |
| 1058642 | 2/1967 | United Kingdom . |
| 1181766 | 2/1970 | United Kingdom . |
| 1393623 | 5/1975 | United Kingdom . |
| 1508576 | 4/1978 | United Kingdom . |
| 1544839 | 4/1979 | United Kingdom . |
| 2009205 | 6/1979 | United Kingdom . |

*Primary Examiner*—Carl F. Dees
*Attorney, Agent, or Firm*—Kenway & Jenney

[57] ABSTRACT

There is provided a pigment composition comprising 100 parts by weight of a pigment and from 0.3 to 30 parts by weight of a colorless or slightly colored aromatic compound having the following general formula (I)

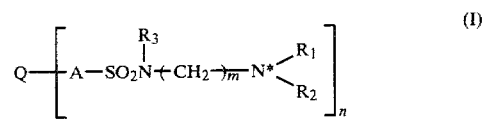

wherein Q represents a residue of an aromatic polycyclic compound which is joined directly or through A to —SO$_2$— radical of the compound of the formula (I), A represents a member selected from the group consisting of —O—,

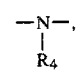

—S—, —CO—, —SO$_2$—,

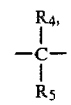

a divalent phenylene residue and a combination thereof, in which $R_4$ and $R_5$ represent, independently, a hydrogen atom or an alkyl group containing from 1 to 4 carbon atoms, $R_1$ and $R_2$ represent, independently, a hydrogen atom or an alkyl group containing from 1 to 4 carbon atoms, or together form a heterocyclic ring together with N* in the formula (I), $R_3$ represents a hydrogen atom or an alkyl group containing from 1 to 20 carbon atoms, m is an integer of from 1 to 6 and n is an integer of from 1 to 3, as well as the use of such a pigment composition to color polyolefins, polyesters, vinyl resins, offset printing ink vehicles, gravure printing inks, nitrocellulose lacquers, room temperature drying or baking paints, urethane resin paints and the like.

6 Claims, No Drawings

PIGMENT COMPOSITIONS AND USE THEREOF

BACKGROUND OF THE INVENTION

1. Field of the Invention

The present invention relates to pigment compositions which have excellent properties for various applications, particularly with regard to non-flocculation and non-crystallization, and to use of such pigment compositions.

2. The Prior Art

In general, useful pigments which exhibit clear colour tone and high tinting strength in various coating compositions consist of fine particles. However, when fine particles of pigment are dispersed in non-aqueous vehicles such as offset printing inks, gravure printing inks and paints, it is difficult to obtain stable dispersions and various problems arise which have a serious influence on the preparation, and also on the value, of the resulting product. For instance dispersions which contain pigments consisting of fine particles are often highly viscous and thus not only is it difficult to withdraw the dispersion product from a dispersing machine and transport it but also, in a worse case, it cannot be used due to gellation during storage. Further, when pigments of different types are mixed, undesirable phenomena such as colour separation by flocculation and precipitation can take place and may cause the dispersion system to be uneven in colour and may also considerably lower the tinting strength. There may also arise problems such as lowering of gloss, an inferiority of levelling and the like in films made from the dispersion system.

In addition to the problem of dispersion of the pigment, some organic pigments undergo a phenomenon involving a change in the crystal structure of the pigment. That is, crystal particles of a pigment which are unstable (from an energy viewpoint) change their sizes and form into a more stable state in a non-aqueous vehicle such as is used for offset printing ink, gravure printing ink and paint and may thus damage the commercial value of the dispersion system, due to a remarkable change in colour tone, reduction of tinting strength and formation of coarse particles.

In order to improve the anti-flocculation and crystal stability of pigments as mentioned above, heretofore there have been proposed a number of pigments including copper phthalocyanine pigments and quinacridone pigments.

The prior attempts may be broadly classified from a technical point of view into the following categories. One approach includes coating the surfaces of pigment particles with colourless compounds such as silicon oxide, aluminum oxide and tert-butyl benzoate as disclosed in U.S. Pat. Nos. 3,370,971 and 2,965,511. The second class includes, as typically described in Japanese Patent Publication No. 41-2466, U.S. Pat. Nos. 4,088,507 and 2,761,865, processes of admixing pigments with compounds which are obtained by introducing onto the organic pigment, as a matrix skeleton, substituents (on side chains) such as a sulphonyl group, a sulfonamide group, an aminomethyl group, a phthalimidemethyl group and the like.

The processes of the second class are better than those of the first class in that the second class of processes provide better non-flocculation and crystal stability and ensure easy preparation of pigment compositions.

However, the second class of processes have a disadvantage, in that, because the added compound is derived from a compound of the same chemical structure as an intended pigment and thus possesses an inherent intense colour, its application is severely restricted when such a compound is used in combination with a pigment whose tone colour is different from the compound. Accordingly, compounds corresponding to individual pigments must be provided, which is very disadvantageous in preparing pigment compositions.

In order to overcome the above disadvantage of the second class of processes, there has been proposed (in Japanese Laid-open Publication No. 54-17932) a pigment composition, as a third class, in which colourless or slightly coloured aromatic compounds, which are obtained by incorporating aliphatic hydrocarbon chains having more than 5 atoms into aromatic compounds having at least 9 atoms which constitute a ring, are added to pigments. However, investigations made by the present inventors have revealed that this pigment composition did not show a satisfactory effect when non-aqueous vehicles, and particularly aromatic solvents such as xylene, toluene and the like, are used.

The inventors of the present invention have made an intensive study of methodologies to inhibit flocculation and to improve the crystal stability of pigments. As a result, it has been found that substantially colourless aromatic compounds which have a substituent of a specific type are effective for the intended purpose when used in combination with pigments.

According to the present invention, there is provided a pigment composition comprising 100 parts by weight of a pigment and from 0.3 to 30 parts by weight of a colourless or slightly coloured aromatic compound having the following general formula (I)

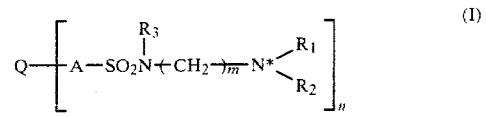

wherein Q represents a residue of an aromatic polycyclic compound which is joined directly or through A to $-SO_2-$, A represents a member selected from the group consisting of $-O-$,

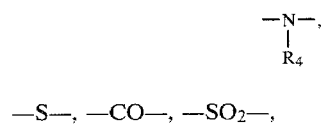

$-S-$, $-CO-$, $-SO_2-$,

a divalent phenylene residue or a combination thereof, in which $R_4$ and $R_5$ represent, independently, a hydrogen atom or an alkyl group containing from 1 to 4 carbon atoms, $R_1$ and $R_2$ represent, independently, a hydrogen atom or an alkyl group containing from 1 to 4 carbon atoms, or together form a heterocyclic ring together with $N^*$ in the formula (I), $R_3$ represents a hydrogen atom or an alkyl group containing from 1 to 20 carbon atoms, m is a integer of from 1 to 6 and n is an integer of from 1 to 3.

The residues of the aromatic polycyclic compounds represented by Q in the general formula (I) include, for example, those of naphthalene, anthracene, phenanthrene, pyrene, chrysene, indole, thiazole, benzimidazole, quinoline, acridone, anthraquinone, phenothiazine, quinazoline, carbazole, benzanthrone and perylene. Q may also include other substituents such as —R$_6$, —OR$_6$,

—COOR$_6$, —NHCOR$_6$,

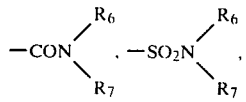

—NR$_6$—CO—R$_7$, —NO$_2$, —CN, —CF$_3$ and —SO$_3$M, in which R$_6$ and R$_7$ represent, independently, a hydrogen atom, a saturated or unsaturated alkyl group containing from 1 to 20 carbon atoms or an aryl group and M represents one equivalent of a mono- to trivalent cation.

A of the general formula (I) represents such divalent groups as defined hereinabove or a combination thereof, but Q may be bonded to —SO$_2$— radical of the compound (I) directly, not through A. Combined divalent groups may be combinations of three or more groups such as

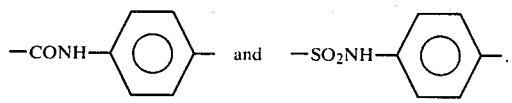

The preparation of the compounds represented by the general formula (I) is not specifically limited. For instance, some of the compounds may be easily obtained by reacting compounds of the following general formula (II) with compounds of the following general formula (III):

$$Q\text{+}A\text{—}SO_2X]_n \quad (II)$$

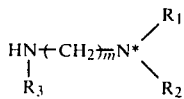  (III)

(in which Q, A, R$_1$, R$_2$, R$_3$, m and n have the same meanings as defined in the formula (I), and X represents a halogen atom).

The compounds of the general formula (I) have a basic group and thus show a strong affinity for the anionic moiety, for example a carboxyl group, of the resin component ordinarily contained in vehicles, which is a reason why the compound improves the dispersability of pigment in many applications.

Examples of pigment useful in the present invention include organic pigments, such as insoluble azo pigments, condensation azo pigments, phthalocyanine pigments, quinacridone pigments, isoindolenone pigments, perylene pigments, perynone pigments, dioxazine pigments, lake pigments, vat dye pigments and basic dye pigments, and inorganic pigments such as carbon black, titanium oxide, chrome yellow, cadmium yellow, cadmium red, red iron oxide, iron black, zinc flower, Prussian blue and ultramarine.

The compounds of the general formula (I) used in the present invention are preferred to be used in an amount in the range of from 0.5 to 30 parts by weight per 100 parts by weight of the pigment. Amounts less than 0.5 parts by weight may not satisfactorily attain the aforementioned advantages, whereas amounts larger than 30 parts by weight may be usable but no increased effect can be expected.

Although the pigment composition according to the present invention may be prepared by merely mixing a powder of a pigment with a powder of the compound represented by the general formula (I), good results can also be obtained by mechanically mixing them in kneaders, rollers, attritor, super mills or various types of powdering or milling machines, by adding a solution containing the compound of the general formula (I) to a suspension system of a pigment in water or an organic solvent, thereby permitting the compound of the general formula (I) to deposit on the surface of the pigment, or by dissolving both an organic pigment and the compound of the general formula (I) in a solvent having strong dissolving power, such as sulphuric acid, and then co-precipitating them with use of a poor solvent, such as water.

When the thus-obtained pigment composition is used as a colourant for polyolefins, polyesters and various vinyl resins and as offset printing ink vehicles, such as for various resin-modified resins, and is used to prepare gravure printing inks, such as with lime rosin varnishes, polyamide resin varnishes and vinyl chloride resin varnishes, or is used to prepare nitrocellulose lacquers, room temperature drying or baking paints, urethane resin paints and the like, it serves to lower the viscosity of the dispersant and reduce the structural viscosity of the dispersion system and thus shows good fluidity as compared with a pigment used alone. In addition, the pigment composition according to the invention normally presents no problems such as colour separation or changes in crystalinity and imparts good colour tone and gloss to printed matter, mouldings or films.

In the following Preparatory Examples, there are described general procedures of preparing typical compounds represented by the general formula (I).

PREPARATORY EXAMPLE 1

β-hydroxynaphthoic acid was reacted with an equimolar amount of thionyl chloride in benzene by heating under reflux for 1 hour while agitating to give a chloride. After completion of the reaction, amines were each added to such a reaction system, followed by further heating under reflux and agitation for 1 hour to obtain compounds of the following formulae:

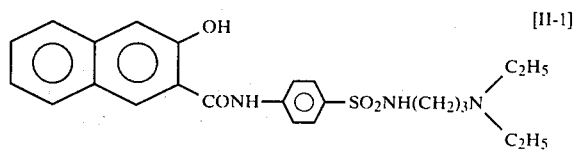

chlorination, followed by reacting with amines to obtain compounds of the following formulae:

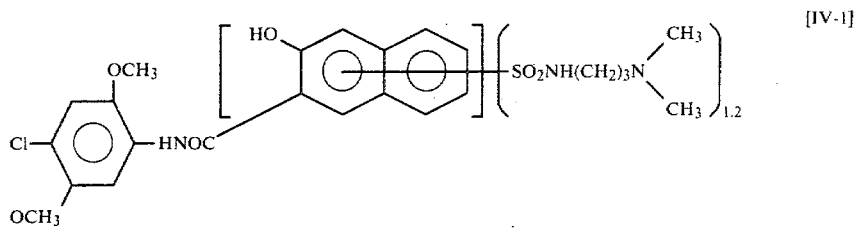

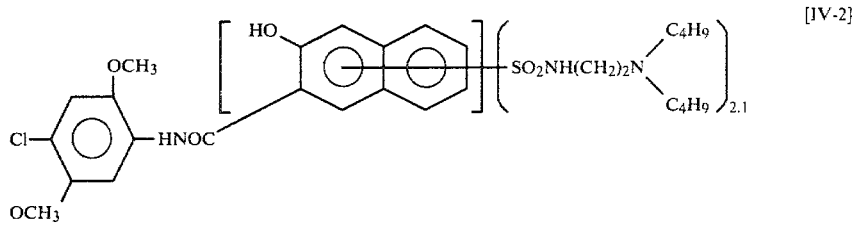

PREPARATORY EXAMPLE 4

2,6-dimethyl-3-hydroxyquinoline-4-carboxylic acid was chlorinated with thionyl chloride in the same manner as in Preparatory Example 1 and then reacted with an amine to obtain a compound of the following formula:

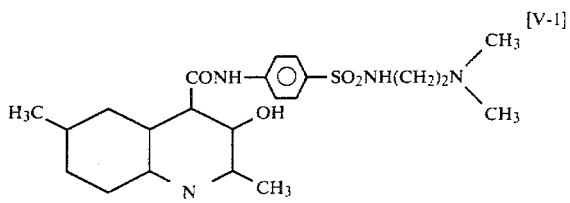

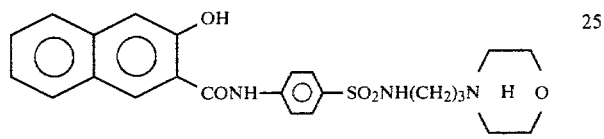

PREPARATORY EXAMPLE 2

2,6-naphthalenedicarboxylic acid was reacted with thionyl chloride in benzene in a molar ratio of 2:1 thionyl chloride to acid while heating and agitating the system under reflux for 1 hour to prepare a chloride. After completion of the reaction, amines were each added to the reaction system to obtain compounds of the following formulae:

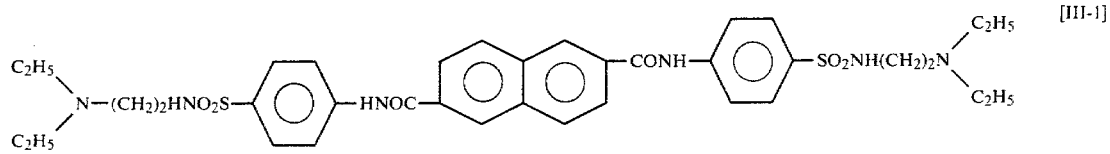

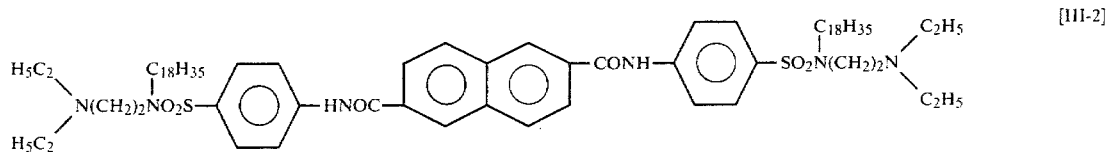

PREPARATORY EXAMPLE 3

2'-hydroxy-3'-naphthoic acid-2,5-dimethoxy-4-chloroanilide was sulfonated in 98% 10 times its weight of sulfuric acid while agitating the system at below 20° C. for 1 hour. The resulting sulfonate was found to contain 1.2 sulfornate groups per molecule.

When the sulfornation reaction was conducted at 40° C. for 1 hour, there was obtained a compound containing 2.1 sulfonate groups per molecule. The thus obtained sulfonates were each reacted with thionyl chloride in the same manner as in Preparatory Example 1 for

PREPARATORY EXAMPLE 5

Phenothiazine was reacted with an equimolar amount of 98% sulfuric acid in 10 times its weight of dioxane to obtain phenothiazinesulfonic acid. This phenothiazinesulfonic acid was found to contain 0.9 sulfonic acid groups per molecule. The thus obtained sulfonic acid was chlorinated with thionyl chloride in the same manner as in Preparatory Example 1 and then reacted with amines to obtain compounds of the following formulae:

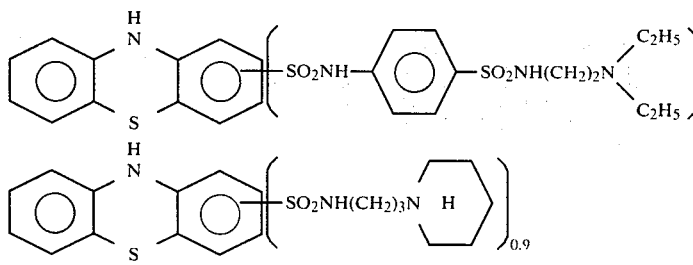

[VI-1]

[VI-2]

PREPARATORY EXAMPLE 6

2-Acetylamino-6-carboxybenzothiazole was treated in the same manner as in Preparatory Example 1 to obtain a chloride, followed by reacting with amines to obtain compounds of the following formulae:

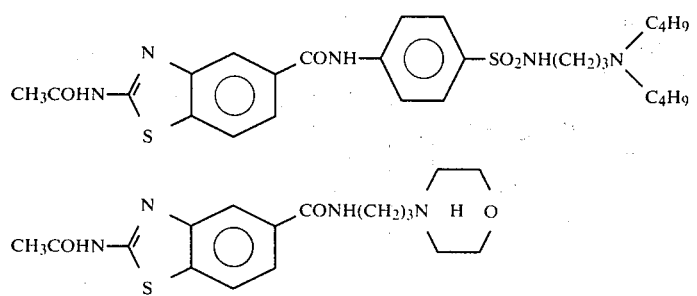

[VII-1]

[VII-2]

PREPARATORY EXAMPLE 7

3-phenyl-5-nitroindole-2-carboxylic acid was chlorinated in the same manner as in Preparatory Example 1 and then reacted with amines to obtain compounds of the following formulae:

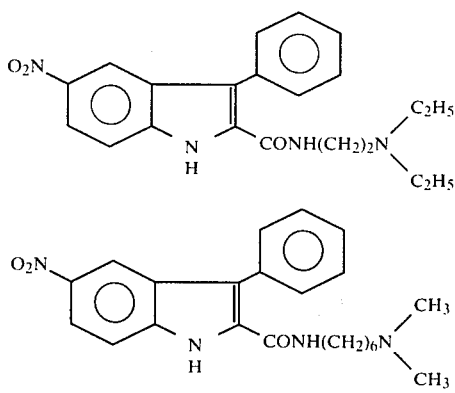

[VIII-1]

[VIII-2]

PREPARATORY EXAMPLE 8

1 mole of acridone was reacted with 1.5 mole of chlorosulfonic acid in concentrated sulfuric acid in an amount 10 times the weight of the acridone at 80°–90° C. for 1 hour to obtain acridonechlorosulfonic acid. This product was found to contain 1.2 chlorosulfone groups per molecule of acridone. Similarly, acridone was reacted with chlorosulfonic acid in a molar ratio of 1:2.5 to obtain a compound having 1.8 chlorosulfone groups per molecule of acridone. The thus obtained acridonechlorosulfonic acid was reacted with amines to obtain compounds of the following formulae:

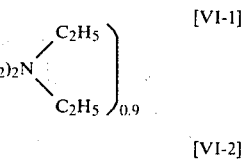

[IX-1]

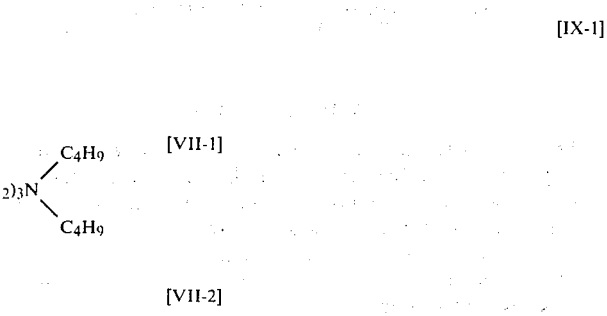

[IX-2]

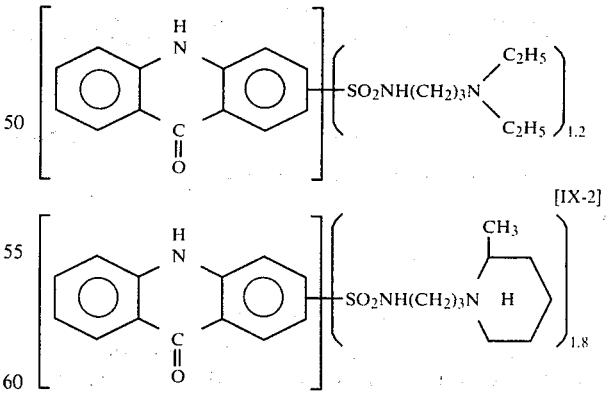

PREPARATORY EXAMPLE 9

Anthraquinone-2-carboxylic acid was chlorinated in the same manner as in Preparatory Example 1 to give the carboxylic acid chloride and then reacted with amines to obtain compounds of the following formulae:

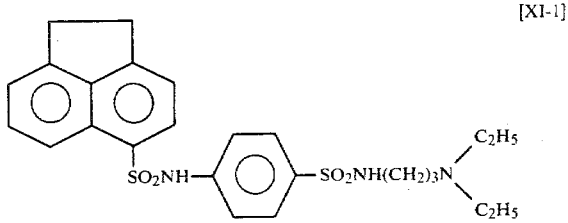

[X-1], [X-2]

PREPARATORY EXAMPLE 10

Acenaphthene-5-sulfornic acid was chlorinated in the same manner as in Preparatory Example 1 and then reacted with an amine to obtain a compound of the following formula:

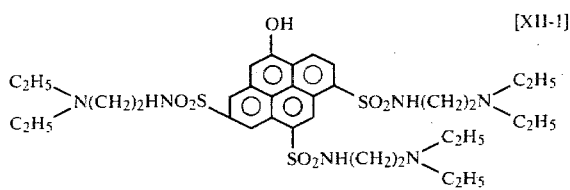

[XI-1]

PREPARATORY EXAMPLE 11

10-hydroxy-3,5,8-pyrenetrisulfonic acid was chlorinated in the same manner as in Preparatory Example 1 and then reacted with an amine to obtain a compound of the following formula:

[XII-1]

The following Examples and Comparative Examples further illustrate the present invention. Compound Numbers in the Tables refer to the Preparatory Examples.

COMPARATIVE EXAMPLES AND EXAMPLES 1 TO 10

Gravure Printing Ink Test

To a vinyl chloride resin varnish for gravure printing were added various types of pigments used singly (Comparative Example) and in admixture with the compounds obtained in Preparatory Examples 1 to 11 in such a way that the content of each pigment was 10% or 25% (when inorganic pigments were used), thereby producing gravure printing inks. The viscosity of these inks was measured. The results are shown in Table 1, from which it is apparent that the pigment composition of the present invention have excellent fluidity.

Further, it was found that the gravure printing inks using the pigment compositions of the invention were excellent as regards clearness of colour tone of printed matter, tinting strength and gloss.

TABLE 1

Viscosity of Gravure Printing Inks (B.M. type rotary viscometer)

| Example No. | Pigment | Compound No. | Mixing ratio | Viscosity (CPS) Number of revolutions of rotor | | | |
|---|---|---|---|---|---|---|---|
| | | | | 6 | 12 | 30 | 60 |
| | C.I. pig Yellow 14 | — | — | 3720 | 1630 | 920 | 710 |
| 1 | C.I. pig Yellow 14 | XII-1 | 90:10 | 1060 | 720 | 650 | 590 |
| 2 | C.I. pig Yellow 14 | IX-1 | 95:5 | 1020 | 700 | 630 | 580 |
| 3 | C.I. pig Yellow 14 | III-1 | " | 1100 | 750 | 670 | 590 |
| 4 | C.I. pig Yellow 14 | VI-1 | 85:15 | 1240 | 920 | 710 | 630 |
| | C.I. pig Red 17 | — | — | 5400 | 2810 | 1780 | 1000 |
| 5 | C.I. pig Red 17 | IX-2 | 95:5 | 2870 | 1530 | 870 | 770 |
| 6 | C.I. pig Red 17 | VI-2 | 85:15 | 3180 | 1750 | 980 | 820 |
| | *C.I. pig Yellow 34 | — | — | 850 | 600 | 540 | 500 |
| 7 | *C.I. pig Yellow 34 | III-2 | 95:5 | 610 | 470 | 390 | 370 |
| 8 | *C.I. pig Yellow 34 | II-1 | 90:10 | 620 | 490 | 400 | 390 |
| | *C.I. pig White 6 | — | — | 770 | 580 | 520 | 500 |
| 9 | *C.I. pig White 6 | X-1 | 95:5 | 570 | 450 | 420 | 390 |
| 10 | *C.I. pig White 6 | XI-1 | 90:10 | 580 | 460 | 420 | 390 |

*Inorganic pigments. The content of pigment in gravure printing ink is percent by weight.

EXAMPLES 11 TO 29

To an aminoalkyd resin varnish for baking paint were added various pigments singly (Comparative Examples) and in admixture with the compounds obtained in Preparatory Examples 1 to 11 in such a way that the content of pigment was 6% or 25% (when an inorganic pigment was used), thereby preparing paints. The viscosities of the paints were measured. The results are shown in Table 2.

The aminoalkyd paints of Examples 11 to 21 in accordance with the invention were found to have excellent fluidity and stability of crystals and films obtained from such paints were also excellent in clearness of colour, tinting strength and gloss. As for storage stability, they did not show any tendency to increase in viscosity and were thus excellent in this respect.

TABLE 2

Viscosity of Aminoalkyd Resin Baking Paints (B.M. Type Rotary Viscometer)

| Example No. | Pigment | Compound No. | Mixing ratio | Viscosity (CPS) Number of revolutions of rotor | | | |
|---|---|---|---|---|---|---|---|
| | | | | 6 | 12 | 30 | 60 |
| | C.I. pig Blue 15 | — | — | 8500 | 6000 | 3500 | 2540 |
| 11 | C.I. pig Blue 15 | IX-1 | 95:5 | 1910 | 1280 | 970 | 920 |
| 12 | C.I. pig Blue 15 | III-1 | " | 2190 | 1400 | 1250 | 980 |
| 13 | C.I. pig Blue 15 | II-1 | 90:10 | 2050 | 1370 | 1110 | 1010 |
| 14 | C.I. pig | IV-1 | " | 2120 | 1380 | 1190 | 1030 |

TABLE 2-continued

Viscosity of Aminoalkyd Resin Baking Paints
(B.M. Type Rotary Viscometer)

| Example No. | Pigment | Compound No. | Mixing ratio | Viscosity (CPS) Number of revolutions of rotor | | | |
|---|---|---|---|---|---|---|---|
| | | | | 6 | 12 | 30 | 60 |
| | Blue 15 C.I. pig Violet 19 | — | — | 7900 | 4520 | 2100 | 1200 |
| 15 | C.I. pig Violet 19 | IX-2 | 95:5 | 4750 | 2870 | 1410 | 960 |
| 16 | C.I. pig Violet 19 | III-2 | " | 4830 | 2940 | 1510 | 1000 |
| 17 | C.I. pig Violet 19 | XIV-1 | 90:10 | 4580 | 2620 | 1320 | 950 |
| 18 | C.I. pig Violet 19 | IV-2 | " | 4980 | 3010 | 1600 | 1080 |
| | C.I. pig Red 168 | — | — | 11500 | 6830 | 4520 | 3600 |
| 19 | C.I. pig Red 168 | VII-2 | 90:10 | 6570 | 4810 | 3130 | 2490 |
| | C.I. pig Yellow 108 | — | — | 9280 | 6310 | 4100 | 2680 |
| 20 | C.I. pig Yellow 108 | X-1 | 90:10 | 5220 | 3760 | 3100 | 2750 |
| 21 | C.I. pig Yellow 108 | II-1 | " | 5640 | 3910 | 3330 | 2880 |
| 22 | C.I. pig Yellow 108 | VII-1 | 85:15 | 5100 | 3690 | 2900 | 2650 |
| 23 | C.I. pig Yellow 108 | XI-1 | " | 5290 | 3810 | 3210 | 2770 |
| | C.I. pig Black 6 | — | — | 12600 | 7100 | 4320 | 3730 |
| 24 | C.I. pig Black 6 | X-2 | 90:10 | 8590 | 5610 | 3620 | 2760 |
| 25 | C.I. pig Black 6 | VIII-1 | 80:20 | 7930 | 5130 | 3560 | 2620 |
| 26 | C.I. pig Black 6 | VII-2 | " | 8290 | 5240 | 3310 | 2560 |
| | C.I. pig Red 101 | — | — | 780 | 630 | 590 | 570 |
| 27 | C.I. pig Red 101 | V-2 | 95:5 | 630 | 520 | 480 | 460 |
| 28 | C.I. pig Red 101 | VII-2 | " | 680 | 570 | 520 | 490 |
| 29 | C.I. pig Red 101 | VI-2 | 90:10 | 690 | 590 | 560 | 540 |

To test the dispersion stability of the paints, several paints were subjected to a flocculation test, in order to judge their susceptibility to colour separation which must be below a certain level for practical applications. That is, the paints listed in Table 3 below were each made using a base paint of titanium oxide, which had been previously prepared using an aminoalkyd resin varnish, so that the mixing ratio of pigment to titanium oxide was 1/10, thereby providing light-coloured paints.

Each light-coloured paint was further diluted with xylene and adjusted to have a viscosity of 20 seconds (25° C.) when measured by the Ford Cup No. 4, followed by charging it along a test tube to observe the flowing state of the charged paint running along the wall surface of the glass tube. The results are shown in Table 3 below.

TABLE 3

| Example No. | Pigment | Compound No. | Mixing Ratio | Just after preparation | 1 day after preparation | 1 week after preparation |
|---|---|---|---|---|---|---|
| (Comparative Example) | C.I. Pigment Blue 15 | — | — | Δ | x | x |
| 11 | C.I. Pigment Blue 15 | IX-1 | 95:5 | ⊚ | ⊚ | ⊚ |
| (Comparative Example) | C.I. Pigment Violet 19 | — | — | ○ | Δ | x |
| 17 | C.I. Pigment Violet 19 | XII-1 | 90:10 | ⊚ | ⊚ | ⊚ |
| (Comparative Example) | C.I. Pigment Red 168 | — | — | ○ | ○ | Δ |
| 19 | C.I. Pigment Red 168 | VII-2 | 90:10 | ⊚ | ⊚ | ⊚ |

Evaluation:
⊚ Completely uniform.
○ White streaks appear in a slight degree.
Δ A white stripe-pattern appears.
x White substance is completely separate.

From the above, it will be seen that the pigment compositions according to the invention are excellent with respect to colour separation tendency.

EXAMPLES 30 TO 41

To a nitrocellulose lacquer were added pigments singly and as compositions of the present invention with the mixing ratios indicated in Table 4 so that the content of pigment or pigment composition was 5.5 wt%. The resulting paints had viscosities as indicated in Table 4.

Further, it was found that the paints using the pigment compositions of the present invention have excellent flowability and coloured films obtained from such paints were also excellent in gloss, clearness of tone colour and tinting strength.

TABLE 4

Viscosity of Paints Using Nitrocellulose Lacquer
(B.M. Type Viscometer)

| Example No. | Pigment | Compound No. | Mixing ratio | Viscosity (CPS) Number of revolutions of rotor | | | |
|---|---|---|---|---|---|---|---|
| | | | | 6 | 12 | 30 | 60 |
| | C.I. Pig Blue 15 | — | — | 7500 | 4350 | 3100 | 2930 |
| 30 | C.I. Pig Blue 15 | IX-2 | 95:5 | 4320 | 2780 | 2050 | 1880 |
| 31 | C.I. Pig Blue 15 | III-2 | " | 4440 | 2910 | 2370 | 2010 |
| 32 | C.I. Pig Blue 15 | II-1 | 90:10 | 4210 | 2620 | 1890 | 1780 |
| 33 | C.I. Pig Blue 15 | IV-2 | " | 4390 | 2830 | 2160 | 1950 |
| | C.I. Pig Red 123 | — | — | 8900 | 6010 | 5430 | 4960 |
| 34 | C.I. Pig Red 123 | XIII-1 | 95:5 | 3520 | 1950 | 1380 | 1020 |
| 35 | C.I. Pig Red 123 | VII-2 | 90:10 | 3480 | 1610 | 1290 | 1010 |
| | C.I. Pig Yellow 12 | — | — | 11000 | 7650 | 5420 | 4610 |
| 36 | C.I. Pig Yellow 12 | XI-1 | 95:5 | 6270 | 4490 | 3120 | 2920 |
| 37 | C.I. Pig | III-1 | 90:10 | 5990 | 4120 | 2860 | 2610 |

TABLE 4-continued

Viscosity of Paints Using Nitrocellulose Lacquer (B.M. Type Viscometer)

| Example No. | Pigment | Compound No. | Mixing ratio | Viscosity (CPS) Number of revolutions of rotor | | | |
|---|---|---|---|---|---|---|---|
| | | | | 6 | 12 | 30 | 60 |
| 38 | C.I. Pig Yellow 12 | II-2 | " | 6180 | 4380 | 3010 | 2820 |
| 39 | C.I. Pig Yellow 12 | IV-1 | 85:15 | 5920 | 4080 | 2840 | 2590 |
| | C.I. Pig Black 6 | — | — | 11350 | 7930 | 5860 | 5200 |
| 40 | C.I. Pig Black 6 | X-2 | 90:10 | 8870 | 6620 | 5490 | 5010 |
| 41 | C.I. Pig Black 6 | VIII-1 | 80:20 | 8790 | 6530 | 5380 | 4980 |

The paints of the Examples indicated in Table 4 were then kept stored for 3 months at 50° C. and then their viscosity was measured with results as shown in Table 5 below.

As is clear from the results shown in Table 5, the paints using the pigment compositions of the invention all have excellent storage stability.

EXAMPLE 42 AMINOACRYL BAKING PAINT VARNISH

An aminoacryl baking paint varnish had incorporated therein C.I. Pigment Orange 36 alone (Comparative Example) and in admixture with Compound V-2 in a mixing ratio of 90:10 so that the pigment and composition were present in an amount of 6 wt%. The resulting paints were compared with respect to their fluidity and it was found that the paint using the pigment composition according to the present invention was much superior to the Comparative Example.

The thus-prepared paints were further mixed with an aluminium paint base, which has been previously prepared with an aminoacryl paint varnish, in a mixing ratio of pigment to alumina of 1/5. In this case, the paint according to the invention showed clearer colour tone and a more excellent gloss than the conventional paint.

TABLE 5

Viscosity of Paints using Nitrocellulose Lacquer Immediately after their preparation and 3 months after the preparation.

| Example No. | Pigment | Compound No. | Mixing ratio | Measuring time | Viscosity (CPS) Number of revolutions of rotor | | | |
|---|---|---|---|---|---|---|---|---|
| | | | | | 6 | 12 | 30 | 60 |
| | C.I. Pig Blue 15 | — | — | Immediately after preparation | 7500 | 4350 | 3100 | 2930 |
| | C.I. Pig Blue 15 | — | — | After 3 months | 11200 | 7420 | 5150 | 3210 |
| 30 | C.I. Pig Blue 15 | IX-2 | 95:5 | Immediately after preparation | 4320 | 2780 | 2050 | 1880 |
| | C.I. Pig Blue 15 | " | " | After 3 months | 4560 | 2870 | 2310 | 2010 |
| | C.I. Pig Red 123 | — | — | Immediately after preparation | 8900 | 6010 | 5430 | 4960 |
| | C.I. Pig Red 123 | — | — | After 3 months | 12500 | 8320 | 5580 | 5110 |
| 34 | C.I. Pig Red 123 | XIII-1 | 95:5 | Immediately after preparation | 3520 | 1950 | 1380 | 1020 |
| | C.I. Pig Red 123 | " | " | After 3 months | 3910 | 2350 | 1620 | 1270 |
| | C.I. Pig Yellow 12 | — | — | Immediately after preparation | 11000 | 7650 | 5420 | 4610 |
| | C.I. Pig Yellow 12 | — | — | After 3 months | 17100 | 12300 | 8870 | 7010 |
| 36 | C.I. Pig Yellow 12 | XI-1 | 95:5 | Immediately after preparation | 6270 | 4490 | 3120 | 2920 |
| | C.I. Pig Yellow 12 | " | " | After 3 months | 6390 | 4560 | 3200 | 2870 |
| | C.I. Pig Black 6 | — | — | Immediately after preparation | 11350 | 7930 | 5860 | 5200 |
| | C.I. Pig Black 6 | — | — | After 3 months | 18130 | 13210 | 9850 | 7920 |
| 40 | C.I. Pig Black 6 | X-2 | 90:10 | Immediately after preparation | 8870 | 6620 | 5490 | 5010 |
| | C.I. Pig Black 6 | " | " | After 3 months | 8960 | 6830 | 5590 | 5160 |

EXAMPLE 43 URETHANE PAINT VARNISH

A urethane paint varnish was with C.I. Pigment Yellow 95 alone (Comparative Example) and in admixture with Compound XI-1 in a mixing ratio of 90:10 so that the pigment was contained in an amount of 10% in each case, thereby providing paints. The paints were compared with respect to their flowability and state of coloured film. As a result, it was found that the paint using the pigment composition according to the present invention had excellent fluidity and the coloured film from such paint also had excellent colour tone and gloss.

We claim:

1. A pigment composition comprising 100 parts by weight of a pigment and from 0.3 to 30 parts by weight of a substantially colourless aromatic compound having the following general formula (I)

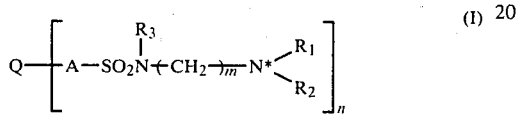

wherein Q is a residue of an aromatic polycyclic compound and A is a direct link between Q and —SO$_2$— or a member selected from the group consisting of —O—,

—S—, —CO—, —SO$_2$—,

a divalent phenylene residue and combinations thereof, in which R$^4$ and R$^5$ represent, independently, a hydrogen atom or an alkyl group containing from 1 to 4 carbon atoms, R$_1$ and R$_2$ represent, independently, a hydrogen atom or an alkyl group containing from 1 to 4 carbon atoms, or R$_1$ and R$_2$ together form a heterocyclic ring together with N* in the formula (I), R$_3$ represents a hydrogen atom or an alkyl group containing from 1 to 20 carbon atoms, m is an integer of from 1 to 6 and n is an integer of from 1 to 3.

2. A composition according to claim 1, wherein the aromatic compound is colourless.

3. A composition according to claim 1, wherein the pigment is an organic pigment selected from insoluble azo pigments, condensation azo pigments, phthalocyanine pigments, quinacridone pigments, isoindolenone pigments, perylene pigments, perynone pigments, dioxazine pigments, lake pigments, vat dye pigments and basic dye pigments.

4. A composition according to claim 1, wherein the pigment is an inorganic pigment selected from carbon black, titanium oxide, chrome yellow, cadmium yellow, cadmium red, red iron oxide, iron black, zinc flower, Prussian blue and ultramarine.

5. A composition according to claim 1, wherein Q is selected from the group consisting of:
(A) naphthalene, anthracene, phenanthrene, pyrene, chrysene, indole, thiazole, benzimidazole, quinoline, acridone, anthraquinone, phenothiazine, quinazoline, carbazole, benzanthrone and perylene; and
(B) members of group (A) substituted with —R$_6$, —OR$_6$,

—COOR$_6$, —NHCOR$_6$,

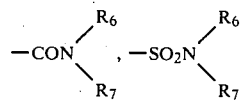

—NR$_6$—CO—R$_7$, —NO$_2$, —CN, —CF$_3$ and —SO$_3$M, in which R$_6$ and R$_7$ represent, independently, a hydrogen atom, a saturated or unsaturated alkyl group containing from 1 to 20 carbon atoms or an aryl group and M represents one equivalent on a mono- to trivalent cation.

6. A composition according to claim 1 wherein A is a direct link between Q and —SO$_2$—.

* * * * *